June 13, 1967 V. K. PELTOLA 3,325,734
TAUT-BAND SUSPENSION GALVANOMETER
Filed Oct. 2, 1963 4 Sheets-Sheet 1

Inventor
Veikko K. Peltola
By Silverman, Mullin, Cass + Kaufman
Attorneys

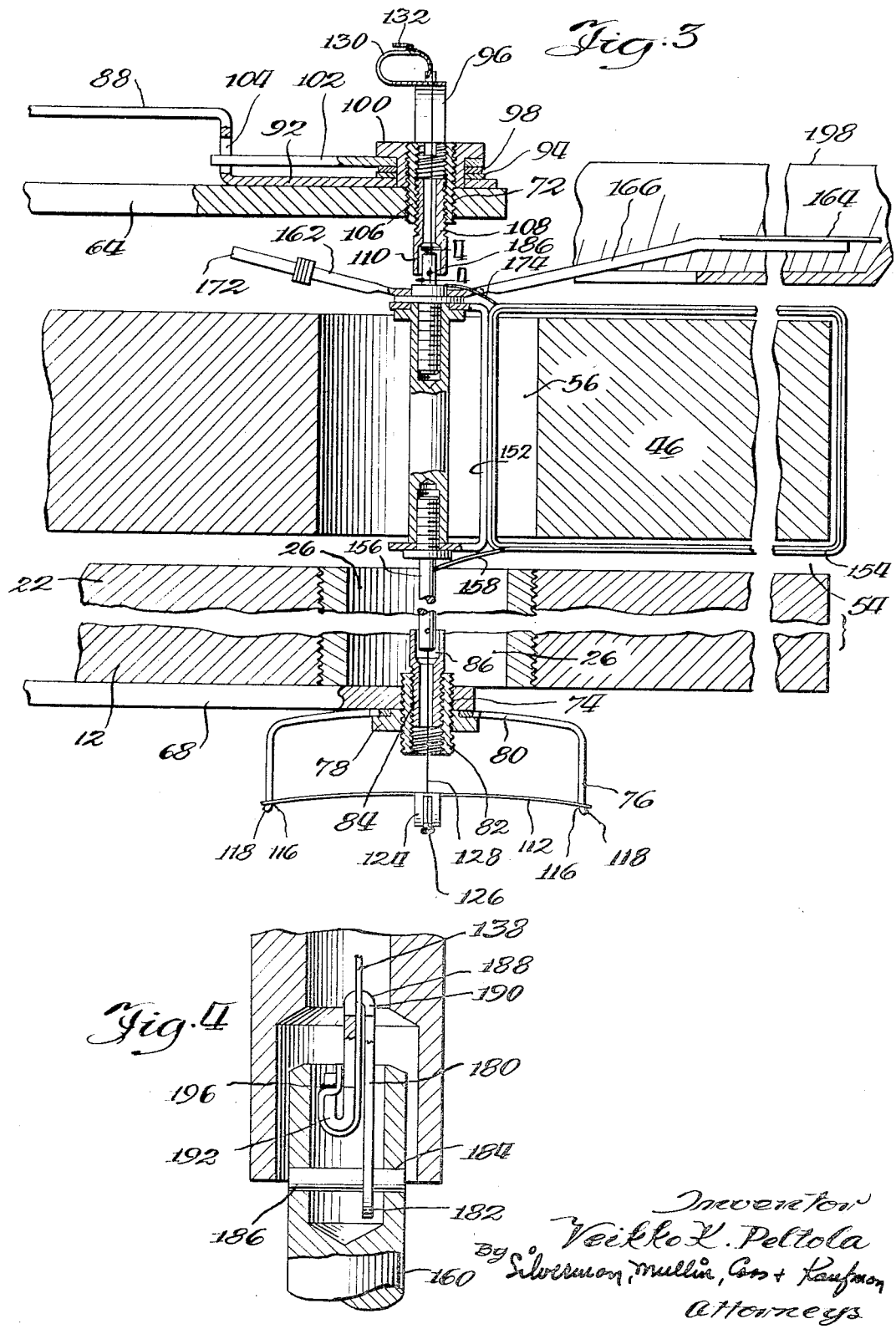

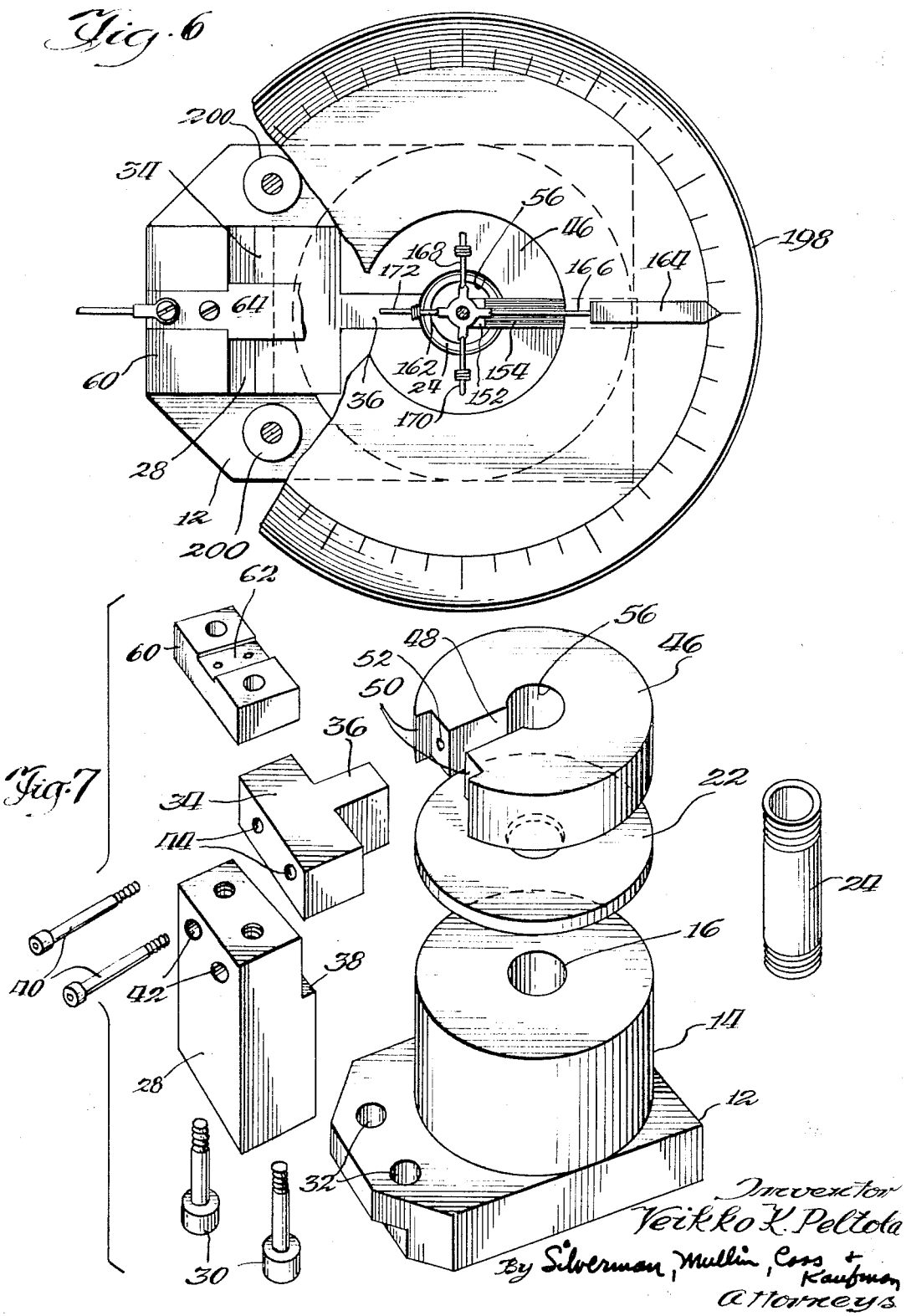

United States Patent Office 3,325,734
Patented June 13, 1967

3,325,734
TAUT-BAND SUSPENSION GALVANOMETER
Veikko K. Peitola, Chicago, Ill., assignor to Illinois Testing Laboratories, Chicago, Ill., a corporation of Illinois
Filed Oct. 2, 1963, Ser. No. 313,278
7 Claims. (Cl. 324—154)

This invention relates generally to direct current galvanometers and more specifically is concerned with what may be called either a single air gap galvanometer or by its more popularly known name, the taut-band suspension galvanometer.

The advantages of the taut-band suspension galvanometer are well known, but perhaps may be reviewed here. Such a device consists of a moving inductive element suspended by two metal bands or fibers, one on each end of the element, the bands being held under substantial tension and the element moving in a magnetic field. The element movement twists the bands, and with the aid of tension the movement recovers by the untwisting of the bands. Such an arrangement obviates many of the disadvantages which have been associated with the more conventional type of galvanometer. These include problems concerned with spiral springs, jewels and pivot bearings, all of which are eliminated in the taut-band suspension meter. Because of its construction, the taut-band suspension meter is frictionless and, in addition, provides a much greater scale arc than capable of being achieved with the conventional instrument. Actually, the scale arc is limited only by the construction of the magnetic circuit. Heretofore 250 angular degrees of spade or needle travel has been a substantial achievement in taut-band suspenison meters.

Prior to this invention, it is believed that all taut-band suspension meters have utilized radial air gaps and because of this construction, it has been difficult in the prior instruments to achieve adequate flux in the air gap and uniform distribution of such flux. For example, in a recent article in the Transactions of the American Institute of Electrical Engineers for September 1959, Communication and Electronics Section, a taut-band suspension instrument is described which achieved a flux density of 2,000 Gauss, considered better than average.

With the invention herein, it is a relatively simple matter to achieve a highly uniform flux density of the order of 3,500 Gauss, giving rise to a more sensitive and rugged meter. Furthermore, the construction of the invention herein enables a meter to be provided with substantially more than 250 degrees of angular arc.

Accordingly, it is the principal object of the invention to provide a taut-band suspension meter having means producing a highly uniform flux of substantially greater density than ordinarily achieved with instruments of this type.

Prior devices have utilized complex constructions in order to achieve uniform flux distribution including, for example, adjustable soft iron compensating members whose positions are varied during the calibration of the meter. Such adjustments, of course, are costly and are required to be made each time an instrument is taken apart.

Another important object of the invention is to provide a taut-band suspension meter in which there is a simple magnetic circuit which provides practically uniform flux distribution without any need for adjustment of the meter before or after assembly and without the use of variable position corrective members.

A still further object of the invention is to provide a taut-band suspension meter in which the magnetic circuit of the meter is so constructed and related to the moving coil of the meter that the effective flux of the magnetic circuit is axial instead of radial and is established between a pair of substantially plane surfaces and hence highly uniform and of extremely high density.

Another object of the invention is to provide a novel construction for suspending the taut-bands of the taut-band suspension meter.

As is the case in many inventions, an important object of this invention sought and achieved in the provision of a taut-band suspension meter of simplicity and economy, but in addition to the achievement of this object, there has been provided a meter which is believed highly superior to other taut-band suspension instruments in that it is more rugged, sensitive and fool-proof, requiring no complex adjustments or intricate paraphernalia for its proper and accurate operation.

As a description of the invention proceeds hereinafter, many advantages will become apparent to those skilled in this art. The drawings illustrate a practical example of the preferred embodiment of the invention to enable a complete understanding of its construction and operation.

In the said drawings:

FIG. 3 is a view similar to that of FIG. 2 but on a greatly enlarged scale and hence somewhat fragmentary.

FIG. 4 is a sectional view taken generally along the line 4—4 in FIG. 3 and in the direction indicated, but on a greatly enlarged scale relative to FIG. 3.

FIG. 6 is a top plan view of the instrument with portions broken away, the arrows of FIG. 2 indicating generally the plane in which the view is broken away.

FIG. 7 is an exploded perspective view showing the magnetic circuit of the instrument.

The invention is characterized by the provision of an annular or cylindrical permanent magnet having a disc-like core of steel suspended above the magnet co-axial therewith and spaced therefrom to leave a very small air gap. A taut-band suspension assembly extends coaxially through both the magnet and the core and mounts a coil of rectangular configuration and of a size slightly larger than a radial section to one side of the axis of the core so that the coil is free to swing about the axis of the core without touching the same. The longer dimension of the core thereby cuts the axially extending flux threading the gap between the magnet and its core and the only limitation upon the angular rotation capable of being achieved by the coil and taut-band suspension is that demanded by the dimensions of the mechanical cantilever support for the core.

The invention is capable of being used with many different suspension structures but another phase of the invention is characterized by the provision of a novel arrangement for applying tension to the taut bands. Such arrangement is in the form of a bow with a cross member or chord provided top and bottom with the suspension secured to the chord of each bow.

Figure 1:
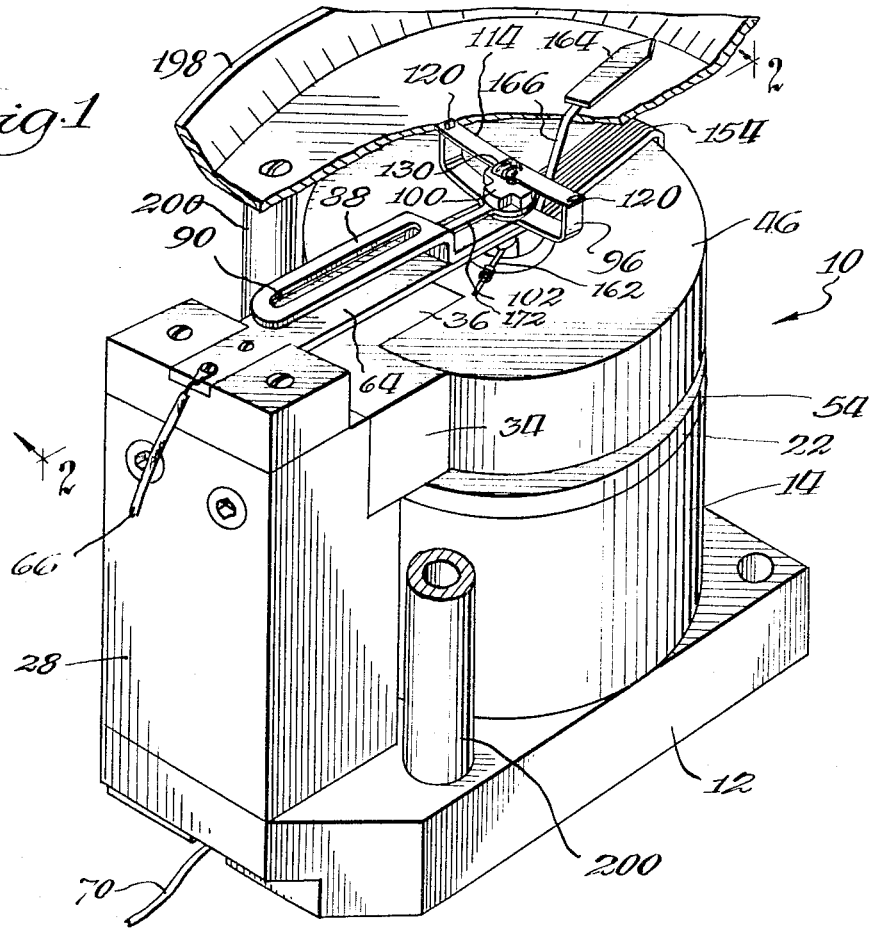
FIG. 1 is a fragmentary elevational view of a taut-band suspension meter constructed in accordance with the invention, the same being shown outside of its casing.

Adverting now to the details of the invention, and especially to FIGS. 1 and 7, the reference character 10 is used to designate the instrument generally and it will be assumed that the instrument is provided with equipment and accessories to form a practical device. The instrument may be a pyrometer, a direct current galvanometer, and may be modified to read alternating current electrical quantities with suitable rectifying or hot wire attachments.

Figure 8:
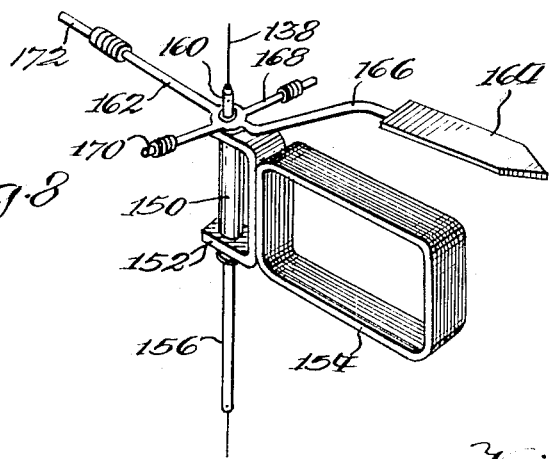
FIG. 8 is a perspective view of the moving coil and quadrant of the instrument, comprising the suspension assembly.

Basically, the instrument comprises a suspension assembly, which shortly will be described, but which is illustrated in FIG. 8, means for supporting the suspension which also will be described, and the magnetic circuit. The primary novelty of the invention is believed to reside in the magnetic circuit since through use of this magnetic circuit a substantially uniform distribution of flux is achieved over the area which is cut by the moving coil of the suspension and such flux is of very high density. Furthermore, the magnetic circuit is simple, rugged and needs no correction or adjustment apparatus.

There is provided a base 12 which is of generally rectangular configuration having a cylindrical permanent magnet 14 mounted thereon, the magnet having a central bore 16 which is aligned with a suitable threaded hole 18 in the base 12. The magnet 14 may also be considered annular. The base 12 has a groove 20 along its length in the bottom thereof whose purpose is to enable the mounting of the lower end of the suspension in a manner to be described.

A relatively thin pole shoe 22 having the same cross-sectional configuration as the magnet 14 is mounted to the top of the magnet and held in place by a generally non-magnetic clamp tube 24 that passes through the center of the magnet 14 and in turn provides a hollow chamber 26 through which the suspension assembly will extend.

A yoke 28 is held to one end of the base 12 by suitable screws 30 passing through holes 32 provided in the base 12 so that the yoke is securely engaged in electromagnetic contact with the base 12. A spacer 34 of generally T-shaped configuration having a forwardly extending tongue 36 is secured to the forward face of the yoke block 28 seated upon a shoulder 38 and held in place by suitable screws 40 passing through holes 42 in the yoke block 28 and engaging through the holes 44 of the spacer 34. A disc-shaped annular core 46 is secured to the spacer 34, there being a radial slot 48 formed in the core, notches 50 to receive the cross-bar of the spacer 34 and threaded openings 52 to be engaged by the screws 40 passing through the holes 42 and 44.

It will be seen that in effect the disc-shaped core 46 is suspended as a cantilever member connected with the yoke block 28 and is spaced above pole shoe 22, thereby providing a very narrow disc-like air gap 54 between the pole shoe 22 and the said annular core 46. The annular core 46 has a central passageway 56 that is aligned with the chamber 26 and is for the same purpose, namely, accommodating the suspension assembly.

As thus far described, it will be obvious that there is a complete magnetic circuit in which the permanent magnet 14 is the primary flux source, the base 12, yoke block 28 and spacer 34 are series connecting members, and the pole shoe 22 and core 46 are juxtaposed members between which flux is required to pass through the air gap 54. All of the members described with the exception of the permanent magnet 14 and the clamp tube 24 may be formed of steel for its ferro-magnetic properties, and the magnet itself is preferably of a well-known alloy of aluminum, nickel and cobalt sold commercially by the General Electric Co. of Schnectady, N.Y., under the trademark "Alnico V." Any other suitably highly magnetic material may be used for the magnet 14. The pole shoe 22 assists in confining the flux produced by the magnet 14 to eliminate fringing as much as possible.

A block 60 of insulating material is secured to the top of the yoke block 28 and provides a groove 62 therein within which there is secured a bridge member 64, and an electrical lead 66 is electrically connected to one of the screws which holds the bridge 64 in place. A similar bridge member 68 is mounted to the bottom of the base 12, in the groove 20 as shown, by means of the screws illustrated, one of which has an electrical lead 70 secured thereto. Bridges 64 and 68 are metal and hence it will be obvious that the lead 70 is the ground lead since it is connected to the magnetic assembly.

Figure 2:
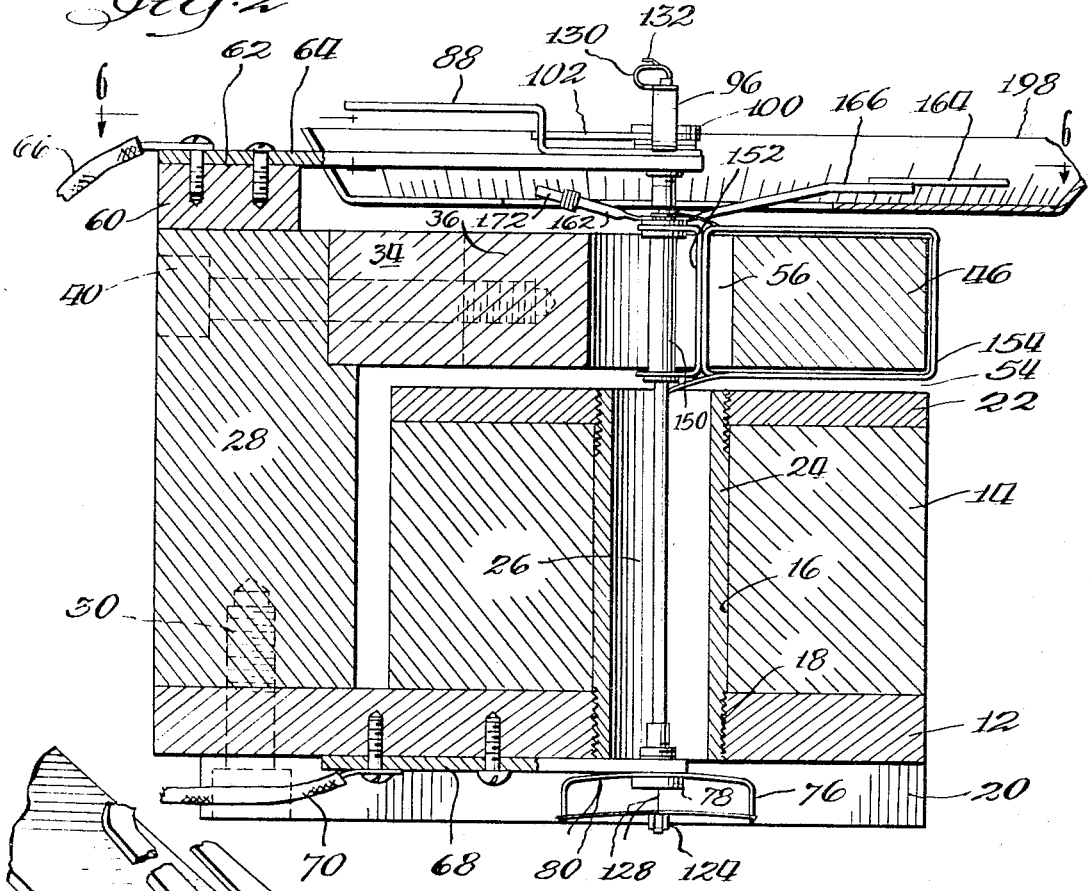
FIG. 2 is a median sectional view of the same taken generally along the line 2—2 of FIG. 1 and in the direction indicated.

Looking now at FIGS. 2 and 3 especially, the bridge member 64 extends over the opening 56 of the disc-shaped core 46 and has a threaded hole 72 therein aligned with the axis of the opening 56. Likewise the bridge member 68 has a similar threaded opening 74 which is axial with the chamber 26. Each of the bridge members 64 and 68 has a bow of highly resilient metal mounted thereon. The bottom bow 76 is held in place by a nut 78 passing through a suitable ring (not shown) integral with the bow, formed in the base 80 of the bow. The nut is threaded upon a bushing 82 that in turn is screwed into the opening 74 and has a limit screw 84 in turn engaged on the interior thereof. The limit screw 84 is hollow and has an upwardly opening enlargement 86 in its bore.

A similar arrangement is provided on the top bridge 64 with the exception that means are provided for swinging the entire assembly to enable zero adjustment. There is an arm 88 slotted as shown at 90 so that a suitable eccentric zero-adjustment screw (not shown) may be turned from the exterior of the apparatus to swing the said arm. The arm has an offset bend therein providing a portion 92 cooperating with the loop 94 which is a part of the bow 96 and a washer 98. All of these are mounted on the nut 100 together with an arm 102 whose end engages in a suitable slot 104 formed in the bend of the arm 88. As stated, swinging of the arm 88 swings the entire assembly.

The nut 100 is mounted on a bushing 106 which has a hollow limit screw 108, quite similar in construction to the limit screw 84, having a hollow central bore and an enlargement at 110.

Figure 5:
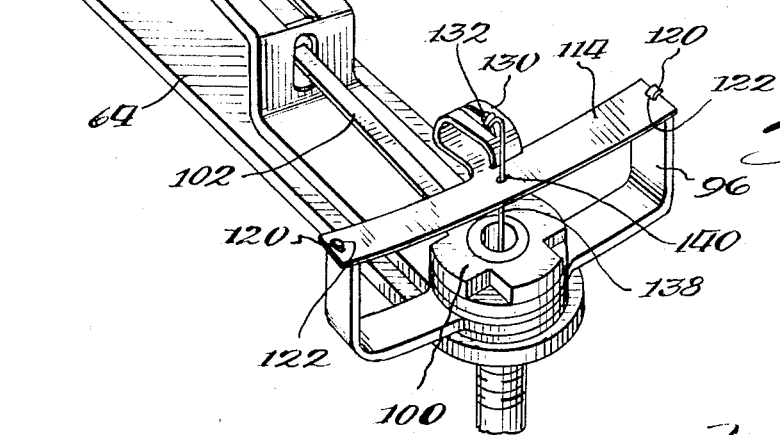
FIG. 5 is a fragmentary perspective view of the zero-adjusting mechanism of the instrument and the top suspension mounting structure.

Each of the bows 76 and 96 is provided with a resilient chord, the chords being designated 112 and 114 respectively. The chord 112 has end notches or openings 116 which engage ears 118 integral with the ends of the bow 76. The bow 76 being quite resilient, tending to open up just like an archer's bow, considerable tension is applied to the chord 112. This is also true of the chord 114 which is secured to the bow 96 in the same way. Ears 120 are shown in FIG. 5 extending through openings 122 formed in the chord ends.

Each bow has a reverse-bent loop integral therewith, the loop 124 having a struck-up tongue 126 around which is wrapped and welded the band 128, the band 128 extending through the hollow bore of the limit screw 84 and being anchored in the suspension assembly in a manner to be described. Likewise, the chord 114 has a loop 130 reverse-bent upon itself, provided with a struck-up tongue 132 to which the upper taut band 138 is secured. Each of the chords 112 and 114 is provided with a central opening through which its respective band extends. One of these openings is best seen in FIG. 5 at 140.

The bottom end of the top band 138 and the top end of the bottom band 128 are both secured by means of anchors to the hollow ends of shafts which in turn form parts of the suspension assembly. Looking at FIG. 8, which is a perspective view of the suspension assembly, there is illustrated a coupling post or rod 150 having a U-shaped bracket 152 secured thereto and to which a rectangular wire coil 154 of many turns is secured as by cement. The coupling rod 150 is of insulating material and bracket 152 is mounted to the rod in such a manner that there is no electrical connection between the fittings which are secured to the upper and lower ends respectively of the said rod 150. A shaft 156 is mounted to the lower end of the rod 150 and one of the coil terminal leads 158 is electrically secured to the said shaft 156. At its bottom end the shaft 156 engages into the enlargement 86 of the limit screw 84 and the upper end of the taut band 128 is anchored therein. The fitting 160 is mounted to the upper end of the coupling rod 150 and it mounts the quadrant 162 and has the lower end of the upper taut band 138 anchored therein.

The quadrant 162 is of conventional construction having the indicator 164 secured to the arm 166 and having the arms 168, 170 and 172 provided with balancing weights. An electrical lead 174 being the other terminal lead of the coil 154 is connected to the said fitting 160, and as shown in FIG. 3. The upper end of the fitting is in the form of a shaft which enters the enlargement 110 of limit screw 108.

Any suitable method of anchoring the taut band ends may be used but in the instant case there is provided at each end an anchor device 180 somewhat in the form of an S. There is a bottom loop 182 that aligns with a suitable pair of opposite openings 184 bored in the respective shafts 156 and 160, only 160 of which is illustrated, and a pin or wire 186 is passed through the shaft 160 and loop 182 and soldered in place to hold the anchor 180. The anchor bends upon itself as shown at 188 and a slot 190 at that point permits passage of the band 138. The anchor member 180 has a portion 192 bent upon itself and provided with a notch 196. As seen in FIG. 4, the band 138 passes through the slot 188 around the bend 192 and into the notch where it is soldered and thereby provides a substantial sturdy anchor for the end of the band. Another such anchor secures the other taut band to shaft 156.

The spade 164 is arranged to move over a scale pan 198 that may be secured to the posts 200 mounted on the base 12.

It will be seen that the coil 154 is connected through the fitting 160 to the band 138, the bow 96 and the bridge 64 to the lead 66, while the other end of the coil 154 is connected by the lead 158 to the bridge 68 and lead 70 in a similar manner. Leads 66 and 70 are to be connected to an external power source whose current is to be measured.

Examining FIG. 3, it will be noted that the coil 154 has substantially the same rectangular cross-section configuration as a section through the disc-shaped core 46 so that while it is free to swing upon the suspension, it also freely passes around the core 46. At the same time, it cuts the flux which extends radially between the pole shoe 22 and the core 46, thereby giving an accurate uniform indication of the electrical quantity being measured. This construction enables at least a swing of 260° and more.

The bow arrangement for securing the suspension is quite durable and efficient since it may be formed of Phosphor bronze members of simple configuration readily assembled or disassembled and certainly readily replaced. There is no need to provide for coil springs which may readily fatigue, and since the bow arrangements are readily replaceable, they may be replaced from time to time to compensate for creep and fatigue. The bow chords provide a convenient arrangement for connecting other apparatus to the device, as, for example, compensating mechanisms as in the case of pyrometers, which may readily be mounted within the chords of the bows.

It is believed that the invention should be readily understood by those skilled in this art and it is desired to point out that considerable variation is capable of being made without in any way departing from the spirit or scope of the invention as defined in the appended claims.

What it is desired to secure by Letters Patent of the United States is:

1. In a taut-band suspension meter comprising a magnetic circuit having a gap, a coil movable in said gap, a suspension assembly carrying said coil and a quadrant with an indicator, a pair of taut-bands connected respectively to the ends of the assembly, and means for securing said bands, the invention herein which includes: means for anchoring said bands to said securing means comprising a resilient bow mounted on each securing means, chords maintaining the bows tensed, each band being attached to one chord and extending through the bow to the said respective ends.

2. The means as claimed in claim 1 in which each chord comprises a resilient member having notched ends secured to the ends of a respective bow.

3. The means as claimed in claim 1 in which the bows each have a center loop and hollow fastening means connecting same to said securing means, and each band passes through the loop and fastening means of its bow.

4. The means as claimed in claim 1 in which the bows have their respective open end portions facing in opposite directions.

5. The means as claimed in claim 1 in which each chord has an anchor loop arranged laterally thereof and a passageway in the center of the chord adjacent the loop, and a band is connected to each respective loop and passes around the loop through the passageway of the respective chord.

6. In a taut-band suspension meter comprising a magnetic circuit having at least one air gap, a coil movable in said air gap, a suspension assembly for mounting said coil relative to said air gap, including a pair of taut-bands having their ends connected to opposite ends of the suspension assembly and the coil respectively, and means for securing the ends of said bands to the suspension assembly, the improvement in said means for securing said bands to the assembly comprising a resilient bow mounted on each end of said suspension assembly, each bow including a pair of upstanding end portions, a resilient cord having its ends attached to said upstanding end portions such that said bow will be placed in a stressed condition and correspondingly prestresses said cord in tension, each of said taut bands being attached to one of said cords and extending through the respective bow to the point of attachment with said coil.

7. The combination as defined in claim 6 wherein each of said cords is provided with a reverse bend loop arranged laterally thereof, an aperture in each of said cords spaced below the terminal ends of said loops, and means on said loops for connecting taut-bands thereto, so that said bands may pass through the apertures in said cords and through the bows to the points of attachment with said coil.

References Cited

UNITED STATES PATENTS

| | | | |
|---|---|---|---|
| 870,803 | 11/1907 | Thwing | 324—150 |
| 2,572,556 | 11/1951 | Zar | 324—150 X |
| 2,719,264 | 9/1955 | Murray | 324—154 X |
| 2,733,408 | 1/1956 | Wakefield | 324—154 |
| 3,047,805 | 7/1962 | Gersch | 324—150 |

FOREIGN PATENTS

| | | |
|---|---|---|
| 456,988 | 11/1936 | Great Britain. |

RUDOLPH V. ROLINEC, *Primary Examiner.*